United States Patent [19]

Habermann et al.

[11] Patent Number: 4,720,649

[45] Date of Patent: Jan. 19, 1988

[54] LARGE DIAMETER RADIAL MAGNETIC BEARING

[75] Inventors: Helmut Habermann, Vernon; Maurice Brunet, Saint Marcel, both of France

[73] Assignee: Societe Europeenne de Propulsion, France

[21] Appl. No.: 894,798

[22] Filed: Aug. 8, 1986

[30] Foreign Application Priority Data

Aug. 12, 1985 [FR] France ................................. 85 12294

[51] Int. Cl.$^4$ ............................................ F16C 39/06
[52] U.S. Cl. ...................................... 310/90.5; 310/217
[58] Field of Search ...................... 310/90.5, 216, 217, 310/261, 263, 264, 268

[56] References Cited

U.S. PATENT DOCUMENTS

| | | | |
|---|---|---|---|
| 3,307,059 | 2/1967 | Kitano | 310/216 |
| 3,488,754 | 1/1970 | Hohnstein | 310/216 |
| 4,264,836 | 4/1981 | Dukshtau | 310/216 |
| 4,489,249 | 12/1984 | Oliver | 310/216 |
| 4,504,098 | 3/1985 | Battarel | 310/90.5 |

FOREIGN PATENT DOCUMENTS

| | | | |
|---|---|---|---|
| 2223218 | 5/1972 | Fed. Rep. of Germany . | |
| 0288851 | 2/1953 | Switzerland | 310/216 |
| 0407302 | 8/1966 | Switzerland | 310/217 |

*Primary Examiner*—R. Skudy
*Attorney, Agent, or Firm*—Roberts, Spiecens & Cohen

[57] ABSTRACT

The rotor of the radial bearing comprises a central shaft and a stack of ferromagnetic laminations constituted by a set of very thin individual laminations each of which extends over a limited angular sector around the periphery of the central shaft, said laminations being disposed in parallel planes so as to constitute a succession of flat split rings extending perpendicularly to the rotor axis. The individual laminations in any given plane are angularly offset relative to the individual laminations of the adjacent planes in such a manner as to provide a stack of laminations which is staggered. A bearing in accordance with the invention is suitable for supporting large diameter shafts which rotate at high speeds.

13 Claims, 4 Drawing Figures

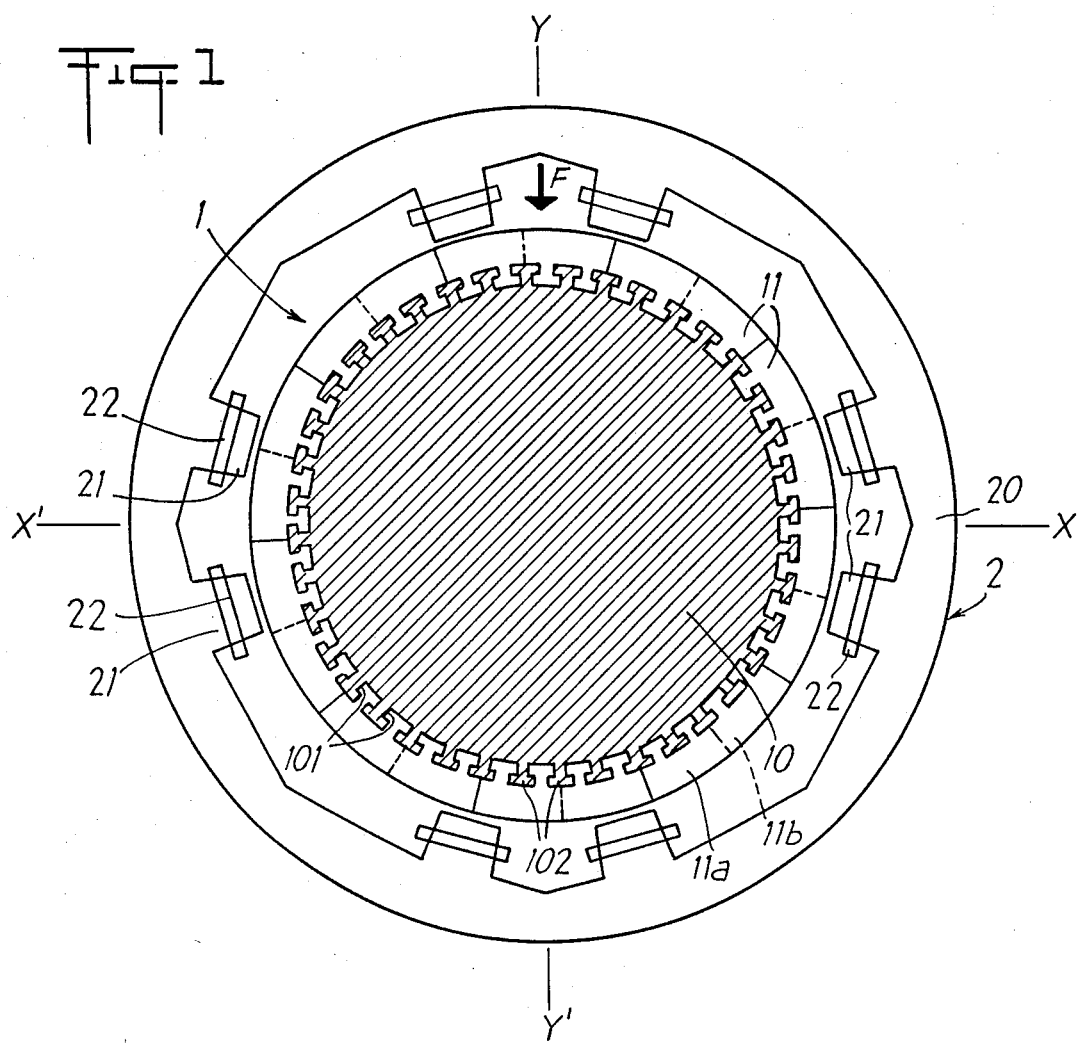
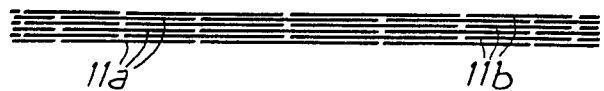

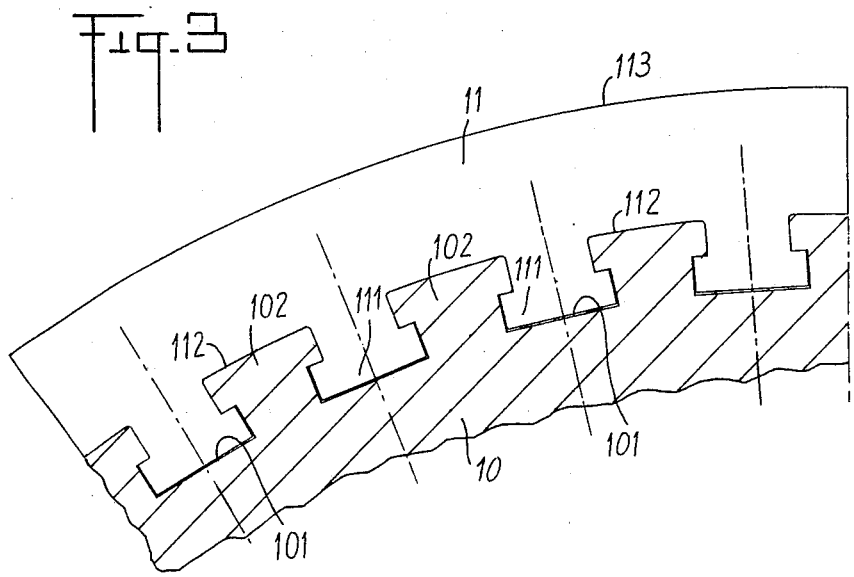
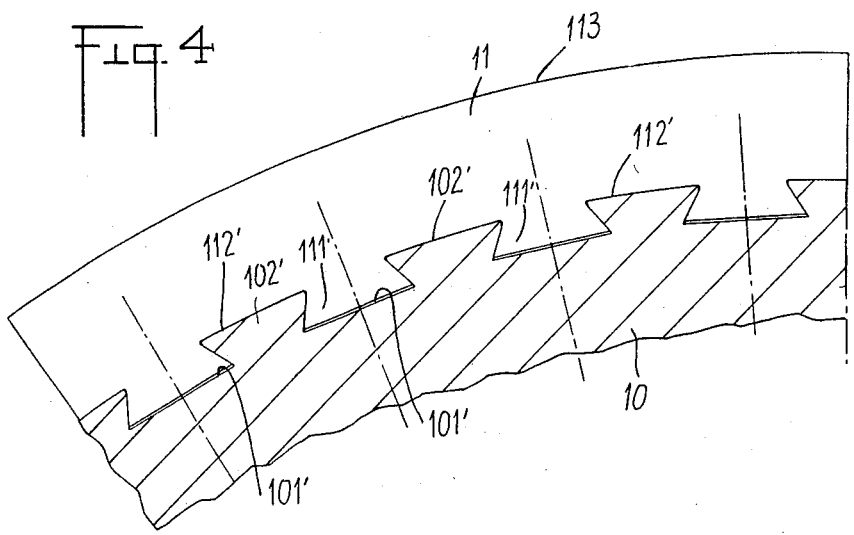

LARGE DIAMETER RADIAL MAGNETIC BEARING

The present invention relates to a large diameter radial magnetic bearing comprising an inner rotor constituted by a central shaft and a stack of ferromagnetic laminations applied to the periphery of the central shaft, and an outer stator constituted by a set of electromagnets whose poles are disposed facing the stack of ferromagnetic laminations on the rotor.

BACKGROUND OF THE INVENTION

In conventional magnetic bearings, the central shaft of the rotor has a stack of magnetic laminations around its periphery in which the laminations are in the form of washers which are coaxial with the central shaft and which enable the magnetic field created by the electromagnets of the magnetic bearing's stator to loop through a material of better magnetic quality than the central shaft.

When a magnetic bearing is of large diameter, the tangential speed of the laminations at the periphery of the rotor nevertheless sets up non-negligible stresses if the laminations are washer-shaped, and given that the mechanical properties of the laminations are relatively poor, the speed of rotation of the rotor must be limited.

Further, large sized sheet material is required for making washer-shaped laminations of large diameter, and when said laminations are cut out from such sheets, there is a high degree of wastage.

Also, in practice, it is particularly difficult to make large sized sheets which are simultaneously very thin and also of high magnetic quality.

Preferred embodiments of the invention seek to remedy the above drawbacks and to provide a large diameter radial magnetic bearing which is cheap to manufacture, which suffers from small eddy current losses, and in which the speed of rotation of the rotor may be high.

SUMMARY OF THE INVENTION

The present invention provides a large diameter radial magnetic bearing of the type defined above including the improvement whereby the rotor's stack of ferromagnetic laminations comprises a set of very thin individual laminations each extending over a limited angular section around the periphery of the central shaft, which laminations are distributed in parallel planes so as to constitute a succession of flat split rings extending perpendicularly to the axis of the rotor, with the individual laminations in a given plane being offset angularly relative to the individual laminations of adjacent planes in such a manner as to provide a staggered stack of laminations.

Advantageously, longitudinally-extending grooves are formed in the periphery of the central shaft of the rotor, and the individual laminations have projecting portions for engaging in said grooves in the central shaft.

In this case it is preferable for the individual laminations to be mounted on the central shaft by means of a dovetail type assembly.

In a particular embodiment of the invention, each individual lamination extends around the periphery of the central shaft through an angular sector of about 30°.

Each row of individual laminations may comprise ten individual laminations each extending around the periphery of the central shaft through an angular sector 36°.

The grooves formed in the periphery of the central shaft are separated from one another at a pitch of about 9°.

The gap between two adjacent individual laminations in the same plane is preferably less than a few tenths of a millimeter.

BRIEF DESCRIPTION OF THE DRAWINGS

Embodiments of the invention are described by way of example with reference to the accompanying drawings, in which:

FIG. 1 is a diagrammatic radial section through a radial magnetic bearing in accordance with the invention;

FIG. 2 is a plan view of the rotor of the FIG. 1 radial bearing as seen in the direction of arrow F;

FIG. 3 is a fragmentary radial section showing a portion of the periphery of the bearing rotor shown in FIGS. 1 and 2 and showing an individual lamination extending over a limited angular sector around the periphery of the rotor; and FIG. 4 shows an individual lamination which constitutes a variant of the lamination shown in FIG. 3.

DETAILED DESCRIPTION

FIG. 1 shows a large diameter active radial magnetic bearing in accordance with the invention, in which a stator 2 surrounds a rotor 1. The stator 2 comprises a magnetic circuit having a peripheral portion 20 which interconnects a plurality of pairs of poles 21 which project radially inwardly towards the rotor 1. Electromagnetic windings 22 are disposed around the various pole 21. The presence of four pairs of for poles 21 disposed along two rectangular axes XX' and YY' makes it possible to hold the rotor 1 in a predetermined radial position. Detectors (not shown) for detecting the radial position of the rotor 1, and servocontrol circuits for controlling the feed currents applied to the electromagnetic windings 22 of the stator 2 are conventional and are therefore not shown or described in greater detail in the present specification.

The rotor 1 comprises a central shaft 10 having a stack of high quality magnetic laminations 11 around its periphery, said laminations being made of silicon iron. The poles 21 of the stator 2 thus face the stack of magnetic laminations 11 and define, together with the outer rims thereof, small air gaps which may lie in the range 0.2 mm to 1 mm, for example.

The central shaft 10 does not have a magnetic effect insofar as the magnetic field lines created by the stator electromagnetic windings 22 are looped solely through the peripheral portion of the rotor as constituted by the stack of magnetic laminations 11. Consequently, the central shaft 10 may be made of a steel which is very strong mechanically and which is capable of supporting a high load, and the magnetic properties of this steel may be fairly poor.

As can be seen in FIGS. 1 and 3, grooves 101 of upside-down T-section are provided in the periphery of the central shaft 10 and extend in the longitudinal direction of the rotor 1. Similarly, T-section projections 102 are also defined between the various grooves 101. The grooves 101 are regularly distributed around the periphery of the shaft 10 and they may be at a pitch of about 9°. If a 9° pitch is selected, there are forty grooves 101 around the periphery of the central shaft 10. The individual laminations 11 which build up the stack applied around the central shaft 10 each have the shape shown in FIG. 3.

An individual lamination 11 is constituted by a portion of a strip which extends around a limited angular sector of the periphery of the central shaft 10 of the rotor 1 to form an angular lamination segment. Each individual lamination, i.e. lamination segment may thus extend over a sector of 36°, for example. In this way, ten individual laminations 11 are placed in a single plane and are distributed around the periphery of the shaft 10 to define a series of successive individual laminations placed side-by-side and leaving small gaps between successive laminations, said gaps being less than a few tenths of a millimeter wide.

In order to reduce the effects of the additional air gaps between adjacent in parallel individual laminations 11, the individual laminations in different adjacent planes 11a, 11b (see FIG. 2) are offset from one another so as to define an assembly of superposed individual laminations 11 which are interleaved in a staggered configuration.

Each individual lamination 11 is cut out from a strip of sheet material, for example a strip which is 300 mm wide, and has a curved outer edge 113 which constitutes a portion of the periphery of the rotor 1 and an inside edge which is cut out in such a manner as to define a succession of T-shaped projections 111 separated by upside down T-shaped notches 112. The projections from the laminations correspond to the grooves 101 in the rotor, while the notches in the laminations correspond to the projections 102 from the central shaft 10. By way of example, each individual lamination 11 extends over an angular sector of 36° and has three full notches on its inside edge together with two end half-notches, and is mounted on the central shaft by engaging its four projections 111 in grooves 101 of the shaft 10.

FIG. 4 shows a variant of an individual lamination 11 in which the laminations 11 are mounted on the rotor 10 by a dovetail type of assembly. In this case, the notches 112' and the projecting portions 111' on the laminations 11 are trapezoidal in shape and the corresponding projecting portions 102' and grooves 101' on the periphery of central shaft 10 are similarly trapezoidal in section and match the notches 112' and the projection portions 111' of the laminations 11 in shape and size. The staggered configuration between the various layers of laminations 11 remains the same as that described above with reference to FIGS. 1 and 2.

When a rotor 1 is constructed as described above, the magnetic laminations 11 may be very thin, for example they may be 0.1 mm thick and the stack of laminations may comprise about one hundred individual laminations disposed in parallel planes 11a and 11b even if the outside diameter of the rotor 1 is large, for example about 1 m to 1.50 m.

Since the individual laminations 11 cover a limited angular sector, e.g. since they cover an arc of about 30°, they are easily manufactured without excessive waste by being cut out from strips of sheet material, as mentioned above, rather than by being cut out from large area sheets as when making a conventional stack of washer-shaped rotor laminations.

This makes it possible to use magnetic sheet material which is of very high quality and which is very thin, thereby reducing eddy current losses since these are proportional to the square of the thickness of the laminations.

Furthermore, dividing the laminations into sectors 11 makes it possible to avoid tangential stresses which exist in laminated rotors built up from stacks of washers, and consequently it is possible to increase the speed of rotation of the rotor since the lamination tangential speed can be considerably higher than 200 m/s.

The width of the laminations 11 may be about 5 cm, for example, for a rotor having diameter of about 1.30 m.

The additional air gap between successive individual laminations situated in the same plane 11a or 11b is of no consequence provided it remains small and provided the individual laminations in two adjacent planes are angularly offset so as to provide a stack of overlapping laminations which are interleaved in a staggered manner.

Each individual lamination could be replaced by a packet of two or three superposed laminations provided that each of the laminations in a packet of laminations is, itself, very thin, e.g. about 0.1 mm thick. In this case, the individual laminations of a flat split ring are angularly offset relative to the laminations of the second or third split rings counting from the initial split ring, rather than the immediately adjacent divided ring. Nevertheless, it is always essential for the stack of laminations to be interleaved in such a manner as to ensure that the overlaps between individual laminations or between small packets of individual laminations prevent the additional air gap between successive adjacent individual laminations located in the same plane from extending more than a few tenths of a millimeter in the circumferential direction.

What is claimed is:

1. A large diameter radial magnetic bearing comprising an inner rotor having an axis of rotation and including a central shaft having an outer periphery, and a stack of ferro-magnetic laminations mounted on said shaft at said outer periphery; and an outer stator comprising a plurality of electromagnets including poles disposed in facing relation to the stack of ferromagnetic laminations on the rotor, said stack of ferromagnetic laminations comprising a plurality of very thin individual lamination segments each extending over a limited angular sector around the periphery of the central shaft, said laminations being distributed in parallel planes to constitute a succession of flat split rings extending perpendicularly to the axis of the rotor, the individual lamination segments in a given plane being offset angularly relative to the individual lamination segments of adjacent planes to provide a staggered stack of laminations, said central shaft having longitudinally extending grooves in the outer periphery thereof, said individual laminations segments including projecting portions which engage in said grooves in the central shaft, said grooves being separated from one another at a pitch of about 9°.

2. A large diameter radial magnetic bearing comprising (a) an outer rotor having an axis of rotation and including a central shaft having an outer periphery, and a stack of ferromagnetic laminations mounted on said shaft at said outer periphery, said stack of ferromagnetic laminations comprising a plurality of very thin individual lamination segments each extending over a limited angular sector around the periphery of the central shaft, said laminations being distributed in parallel planes to constitute a succession of flat split rings extending perpendicularly to the axis of the rotor with the individual lamination segments in a given plane being offset angularly relative to the individual lamination segments of adjacent planes to provide a staggered stack of laminations, said central shaft being provided with anularly spaced longitudinally extending grooves in said periphery, said individual lamination segments each including complementary projecting portions which engage in said grooves in the central shaft, whereby the individual lamination segments are mounted on said central shaft of the rotor solely by the assembly of the projecting portions in the complementary grooves and (b) an outer stator comprising plurality of electromagnets including poles disposed in spaced facing relation with said stack of ferromagnetic laminations on the rotor.

3. A magnetic bearing as claimed in claim 2, wherein the projecting portions of said individual lamination segments are of T-shape.

4. A magnetic bearing as claimed in claim 2, wherein the projecting portions of said individual lamination segments are of a dovetail shape.

5. A magnetic bearing as claimed in claim 2, wherein each of said individual lamination segments to extend over an angular sector of about 30° around the periphery of the central shaft.

6. A magnetic bearing as claimed in claim 2, wherein in each said plane of laminations there are ten individual lamination segments each extending over an angular sector of 36° around the periphery of the central shaft.

7. A magnetic bearing as claimed in claim 2, wherein the stack of laminations comprises about one hundred individual lamination segments disposed in parallel planes.

8. A magnetic bearing as claimed in claim 2, wherein each individual lamination segment is about 0.1 mm thick.

9. A magnetic bearing as claimed in claim 2, wherein adjacent individual lamination segments in each plane form gaps therebetween of a width less than a few tenths of a millimeter.

10. A magnetic bearing as claimed in claim 2, wherein said rotor has an outside diameter greater than about one meter.

11. A magnetic bearing as claimed in claim 2 wherein said individual lamination segments have smooth ungrooved outer peripheral surfaces which, in each plane, are aligned to form a smooth substantially continous ungrooved outer surface for the split ring in said plane.

12. A magnetic bearing as claimed in claim 11 wherein said projecting portions of said individual angular segments project radially inwards into said complementary grooves and are comprised of end projecting portions spaced from respective lateral edges of each individual angular segment and intermediate projecting portions between said end projecting portions.

13. A magnetic bearing as claimed in claim 2 wherein the individual lamination segments in each plane defines an outer surface which faces said poles in spaced relation defines.

* * * * *